US006923232B1

(12) United States Patent
Welbes et al.

(10) Patent No.: US 6,923,232 B1
(45) Date of Patent: Aug. 2, 2005

(54) TREAD FOR A LIGHT TRUCK OR AUTOMOBILE TIRE

(75) Inventors: Paul Welbes, Luxembourg (LU); Claude Lardo, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/018,104

(22) PCT Filed: Dec. 14, 1999

(86) PCT No.: PCT/US99/29527

§ 371 (c)(1),
(2), (4) Date: Nov. 5, 2001

(87) PCT Pub. No.: WO01/00427

PCT Pub. Date: Jan. 4, 2001

Related U.S. Application Data

(63) Continuation-in-part of application No. 29/106,959, filed on Jun. 24, 1999, now Pat. No. Des. 424,985.

(51) Int. Cl.[7] .................. B60C 11/04; B60C 11/12; B60C 101/00; B60C 103/00; B60C 105/00
(52) U.S. Cl. .................. 152/209.18; 152/209.22; 152/901; 152/DIG. 3
(58) Field of Search ............... 152/209.18, 209.22, 152/900, 901, 903, DIG. 3, 209.1

(56) References Cited

U.S. PATENT DOCUMENTS

| D66,870 | S | 3/1925 | Miller e tal. | |
|---|---|---|---|---|
| 2,272,879 | A | * 2/1942 | Hargraves | 152/209.22 |
| D169,914 | S | 6/1953 | Roberts | D90/20 |
| D177,655 | S | 5/1956 | Wolfer | D90/20 |
| 3,012,599 | A | * 12/1961 | Bensen et al. | |
| 3,409,064 | A | * 11/1968 | Leonard | |
| 3,534,798 | A | 10/1970 | Ravenhall | 152/209 |
| 3,682,220 | A | 8/1972 | Verdier | 152/209 D |
| D225,915 | S | 1/1973 | Wilcox | D90/20 |
| 4,078,596 | A | * 3/1978 | Nakayama et al. | |
| 4,362,201 | A | * 12/1982 | Zinnen et al. | |
| 4,387,754 | A | * 6/1983 | Mirtain et al. | |
| D336,271 | S | 6/1993 | Suzuki | D12/147 |
| D347,811 | S | 6/1994 | Labbe et al. | 152/209 R |
| 5,415,215 | A | 5/1995 | Covert et al. | 152/209 |
| 5,526,860 | A | * 6/1996 | Minami | |
| 5,658,404 | A | 8/1997 | Brown et al. | 152/209 A |
| 5,833,781 | A | * 11/1998 | Fukumoto et al. | |
| 6,196,288 | B1 | * 3/2001 | Radulescu et al. | 152/209.17 |

FOREIGN PATENT DOCUMENTS

| BE | 739493 A | | 3/1970 |
|---|---|---|---|
| DE | 3625120 | * | 1/1988 |
| DK | 8708747 | | 8/1987 |

(Continued)

*Primary Examiner*—Steven D. Maki
(74) *Attorney, Agent, or Firm*—Nancy T. Krawczyk; David L. King

(57) ABSTRACT

A tread (12) for a light truck or automobile tire (10) has a continuous rib (30, 32) between an adjacent piece of circumferentially continuous grooves (20, 22, 24). The tread (12) has a plurality of hook-shaped semi-blind grooves (40) originating from the circumferentially continuous grooves (20, 22, 24). Each rib (30, 32) has two rows of circumferentially spaced hook-shaped semi-blind grooves (40).

10 Claims, 9 Drawing Sheets

FOREIGN PATENT DOCUMENTS

| EP | 231448 | * | 8/1987 |
| EP | 0640498 |   | 3/1995 |
| JP | 5-605 | * | 1/1993 |
| WO | WO 98/26945 | * | 6/1998 |

* cited by examiner

TREAD FOR A LIGHT TRUCK OR AUTOMOBILE TIRE

This a continuation in part of application 29/106,959 filed Jun. 24, 1999, now U.S. Des. 424,985.

TECHNICAL FIELD

This invention relates to a tread for a pneumatic light truck or automobile tire. More particularly, the tread is designed for heavily loaded on road applications.

BACKGROUND ART

With the continuing rise in popularity of light trucks and cargo vans, there exists a need to provide tires that have the ability to be driven on paved roads while carrying heavy loads without excessive noise yet also to be capable of being driven in heavy snow or wet roads. Often these tires will be driven in flooded or wet roadway conditions. As an added condition, these multipurpose traction demands for the tire must be coupled with excellent tread wear.

Historically, tires have been able to meet one or two of the above-referenced design requirements but usually at the sacrifice of the other design features.

Snow tires for cargo van tires would achieve good traction usually by opening the tread pattern and providing large block type tread elements. These tires generally were very noisy and had poor treadwear when driven at highway speeds on paved roads.

A latter developed asymmetric nondirectional tire was developed for the light truck and sport utility vehicles called the Wrangler GSA. This tire employed a unique triple traction feature that provides excellent uniform wear across the tread pattern regardless of the wheel position. The tire has good noise and more than adequate traction in a variety of conditions such as snow, off road, and on road wet or dry. The tread pattern disclosed in U.S. Pat. No. 5,415,215 was one of the first truly multipurpose tires for these types of vehicles. The Wrangler GSA tire has been commercially very successful.

From that tire, a superior wet traction tire was developed employing two wide aquachannels in combination with the triple traction feature. The tire has been entitled the Wrangler Aquatred and it is disclosed in U.S. patent application Ser. No. 08/228,056. This tire demonstrated that deep water traction could be enhanced without sacrificing the wear and other performance features of the original Wrangler GSA tire.

The Wrangler Aquatred demonstrated that while the all around performance of these light truck and sport utility tires must be very good, some drivers still have special needs or concerns requiring the more specialized type tire performance in one or more feature.

A particular specialized problem arises in the application wherein heavily loaded cargo trucks such as the light truck or cargo van size vehicles are concerned. These vehicles are primarily driven on paved roads. The commercial nature of this vehicle demands that the tires exhibit excellent treadwear and very low tire noise. The commonly accepted tread for such a vehicle has generally been a ribbed-type tread. The ribs are generally circumferentially continuous bands of rubber. The use of lateral grooves is limited primarily because lateral grooves accelerate the rate of treadwear. This is due to the fact that voids such as grooves generally provide traction, but naturally a loss of treadwear results because the net-road contacting area is reduced by the use of grooves. A second contributing factor to the loss of treadwear is the lateral grooves create an entry and exit point into and out of the tires contact patch that can initiate heel/toe wear.

For these reasons, the tire designers prefer to employ ribs where possible. The other added benefit to ribs are they are inherently more quiet that tread block elements.

The dilemma is to devise a way to increase the traction performance of these treads without sacrificing treadwear or noise performance of rib-type treads. While the rib-type tread wears generally well, it has occurrences of irregular wear along the edges of the circumferentially continuous grooves. This irregular wear is most problematic when the ribs exhibit variable stiffness.

There has been a continual trade-off in attempting to increase the aggressive wet road and snow traction performance of these tires while maintaining the treadwear durability and noise constraints.

The invention disclosed in this patent application teaches a novel tread that is both quiet and long wearing while also achieving excellent road traction.

SUMMARY OF THE INVENTION

A tread (12) for a tire (10) has two or more circumferentially continuous grooves (20,22,24) and a continuous rib (30,32) between each pair of circumferentially continuous grooves (20,22) or (22,24).

The tread (12) has a plurality of circumferentially spaced hook-shaped semi-blind grooves (40) originating each in a circumferentially extending groove (20,22,24), arranged in two rows (1,2) in each continuous rib (30,32). The first row (1) of hook-shaped semi-blind grooves (40) intersect an adjacent circumferentially continuous groove (20,22,24). Each of the hook-shaped semi-blind grooves (40) in each row (1,2) is inclined obliquely as measured from a centerline (45) bisecting the hook-shaped semi-blind grooves (40) relative to the circumferentially continuous groove.

In one embodiment the hook-shaped semi-blind grooves 40 of the second row (2) are similarly oriented, but oppositely inclined relative to the hook-shaped semi-blind grooves (40) of row (1) within a respective rib (30,32).

In an alternative embodiment the hook-shaped semi-blind grooves of the second row are similarly inclined, but oppositely oriented to the hook-shaped semi-blind grooves (40) of row 1 within a respective rib (30,32).

In the preferred embodiment the hook-shaped semi-blind grooves (40) has an open portion (41) originating from the circumferentially continuous groove (20,22,24) and extending to the bisecting centerline (45). Thereafter, the blind portion (42) of the groove (40) extends substantially circumferentially to an end 47. A sipe incision 50 extends the end (47) from and is oriented in the same direction as the blind portion (42). Most preferably the circumferentially spaced hook-shaped semi-blind grooves (42) and the sipe incisions (50) extending therefrom are spaced uniformly from each other within each row, and are uniformly spaced from the laterally adjacent hook-shaped semi-blind grooves wherein the tread stiffness of each rib (30,32) adjacent each circumferentially continuous groove (20,22,24) is reduced by the grooving generally uniformly and across the rib laterally, the bending stiffness of the rib is decreased by the orientation of the hook-shaped semi-blind grooves (40) enabling the ribs (30,32) to compliantly bend into and out of the tires contact patch as the tire rotates.

The most preferred embodiment tire tread 12 has three circumferentially continuous grooves (20,22,24), and two continuous ribs (30,32). Each rib (30,32) is adjacent to and between a pair of circumferentially continuous grooves (20,22) or (22,24). The hook-shaped semi-blind grooves (40) of one rib (30,32) are similarly oriented, but oppositely inclined within each respective rib (30,32), but are oppositely oriented relative to the hook-shaped semi-blind grooves (40) of the opposite rib.

In this preferred embodiment, the hook-shaped semi-blind grooves (40) of each rib (30,32) intersecting a common groove (22), intersect the common circumferentially continuous groove (22) at a substantially circumferentially aligned location relative to the intersection of the axially adjacent hook-shaped semi-blind grooves (40) of the other rib (30 or 32).

The tread (12) has a pair of lateral tread edges (14,16) defining the tread width (TW) and the distance halfway between the lateral tread edges (14,16) defines the equatorial plane (EP) of the tread (12) and the common circumferentially continuous groove (22) is centered at the equatorial plane (EP) of the tread (12).

It is further believed desirable that each hook-shaped semi-blind groove (40) has its centerline oriented at an angle θ in the range of 30° to 60°, preferably about 45° relative to the equatorial plane (EP) of the tread.

In each embodiment the tread (12) has a pair of shoulder ribs (34,36). A first shoulder rib (34) is adjacent to and lies between the first lateral edge (14) and a circumferentially continuous groove (20). A second shoulder rib (36) is adjacent to the second lateral edge (16) and lies between the circumferentially continuous groove (24) and the second lateral edge (16). Each shoulder rib has a plurality of circumferentially spaced curved grooves intersecting an adjacent circumferentially continuous groove (20,24) at locations in substantially linear alignment with the location of intersection of the hook-shaped semi-blind grooves (40) and the respective circumferentially continuous grooves (20,24).

Preferably each curved groove (46) changes orientation by about 90° as the groove extends outwardly toward a lateral tread edge (14,16). Each curved groove has a full depth (D) at the lateral extremes and a reduced depth (d) therebetween the lateral extremes, (d) being about 50% of (D) or less.

BRIEF DEFINITIONS OF THE DRAWINGS

DEFINITIONS

Figure 1:
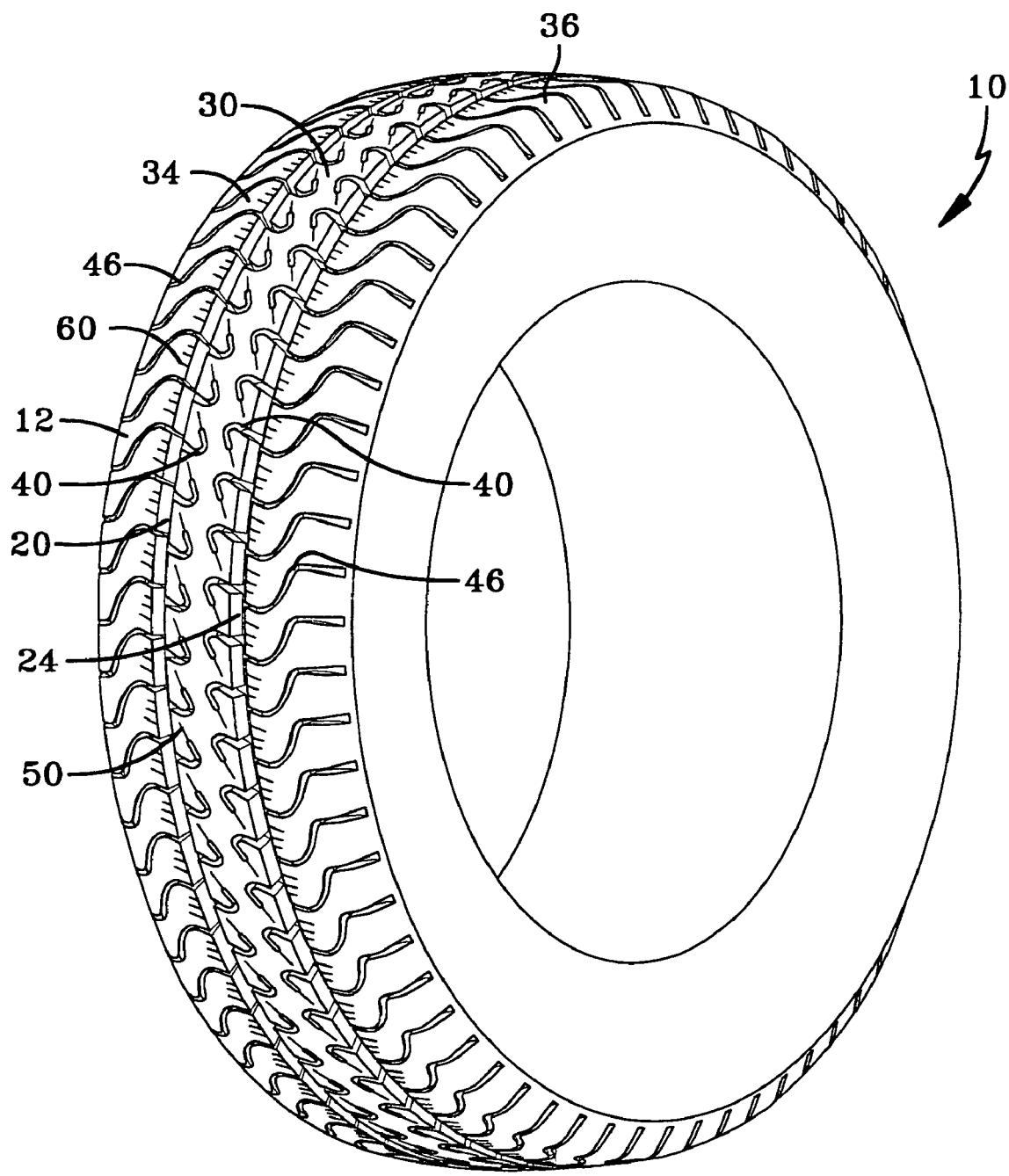
FIG. 1 is a perspective view of the tread according to a first embodiment of the invention.
Figure 2:
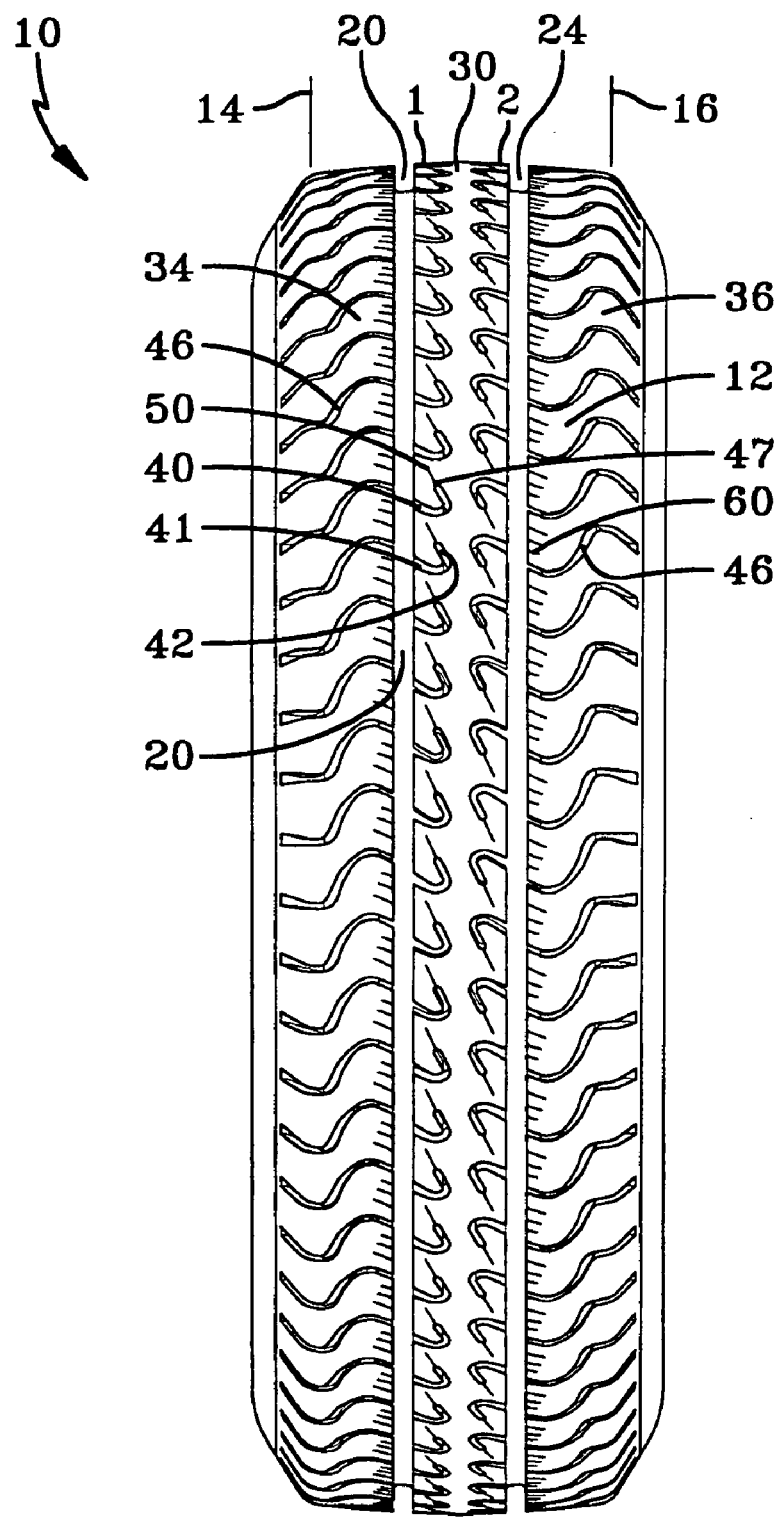
FIG. 2 is a plan view of the tread of FIG. 1.
Figure 3:
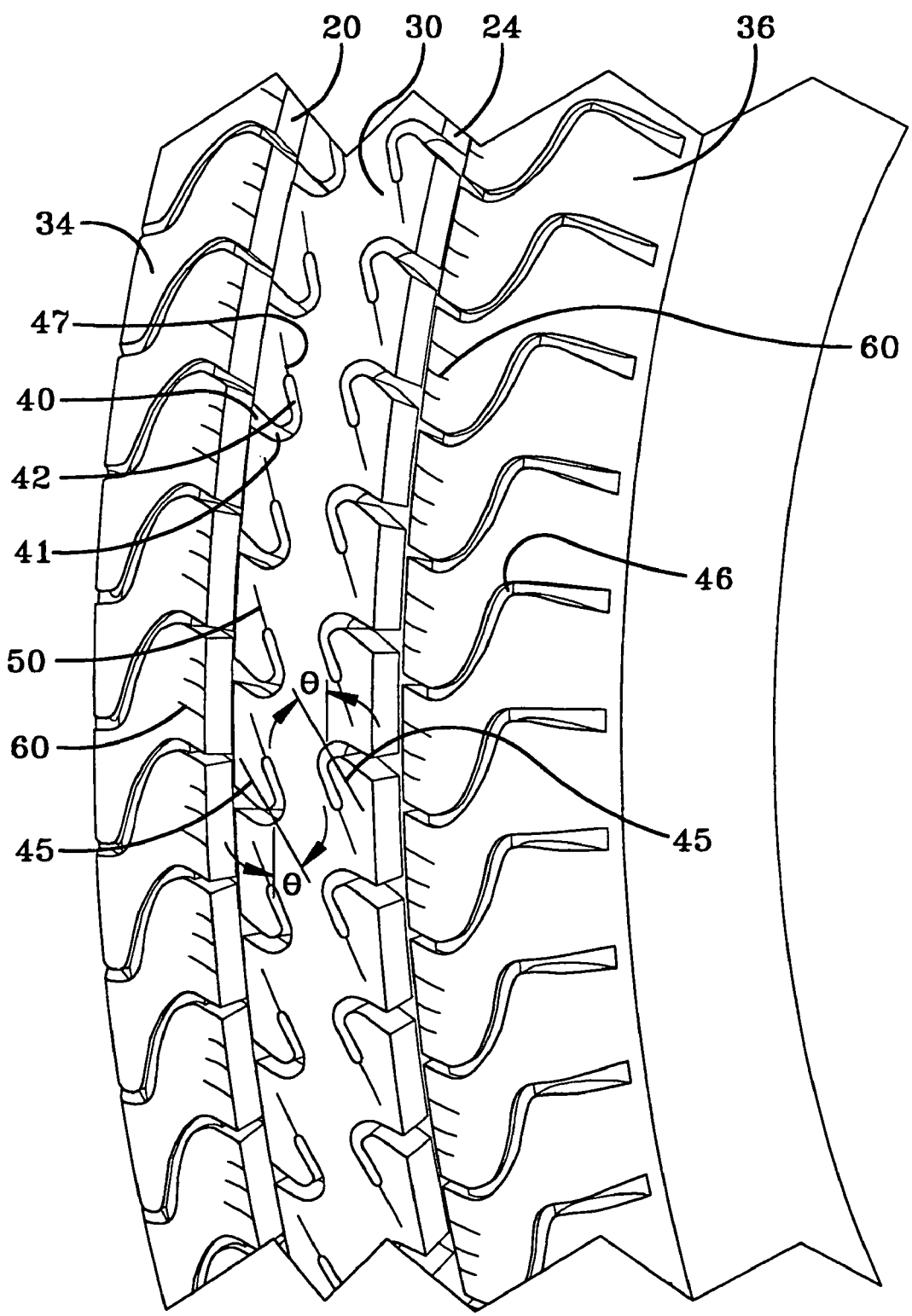
FIG. 3 is an enlarged fragmentary view of the tread of FIG. 2.

For ease of understanding this disclosure the following items are disclosed:

"Aspect ratio" of the tire means the ratio of its section height (SH) to its section width (SW) multiplied by 100% for expression as a percentage.

"Asymmetric tread" means a tread that has a tread pattern not symmetrical about the centerplane or equatorial plane EP of the tire.

"Circumferential" means lines or directions extending along the perimeter of the surface of the annular tread perpendicular to the axial direction.

"Equatorial plane (EP)' means the plane perpendicular to the tire's axis of rotation and passing through the center of its tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface are occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves, which they interconnect, they are regarded as forming "tie bars" tending to maintain a rib-like character in the tread region involved. As used herein a groove is intended to have a width large enough to remain open in the tires contact pitch or footprint.

"Inboard side" means the side of the tire nearest the vehicle when the tire is mounted on a wheel and the wheel is mounted on the vehicle.

"Lateral" means an axial direction.

"Net contact area" means the total area of ground contacting elements between defined boundary edges divided by the gross area between the boundary edges as measured around the entire circumference of the tread.

"Net-to-gross ratio" means the total area of ground contacting tread elements between the lateral edges around the entire circumference of the tread divided by the gross area of the entire tread between the lateral edges.

"Non directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning. "Axial" and "axially" means lines or directions that are parallel to the axis of rotation of the tire.

"Outboard side" means the side of the tire farthest away from the vehicle when the tire is mounted on a wheel and the wheel is mounted on the vehicle.

"Radial" and "radially" means direction radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" or "incision" means small slots molded into the tread elements of the tire that subdivide the tread surface and improve traction, sipe are designed to close when in the tires contact patch or footprint as distinguished from grooves.

"Tread element" or "traction element" means a rib or a block element.

DETAILED DESCRIPTION OF THE INVENTION

With the reference to FIGS. 1–5, a tire (10) having a tread (12) according to a first embodiment of the present invention is shown. The tread (12) when configured annularly has an axis of rotation R, first and second lateral edges (14, 16).

Figure 4:
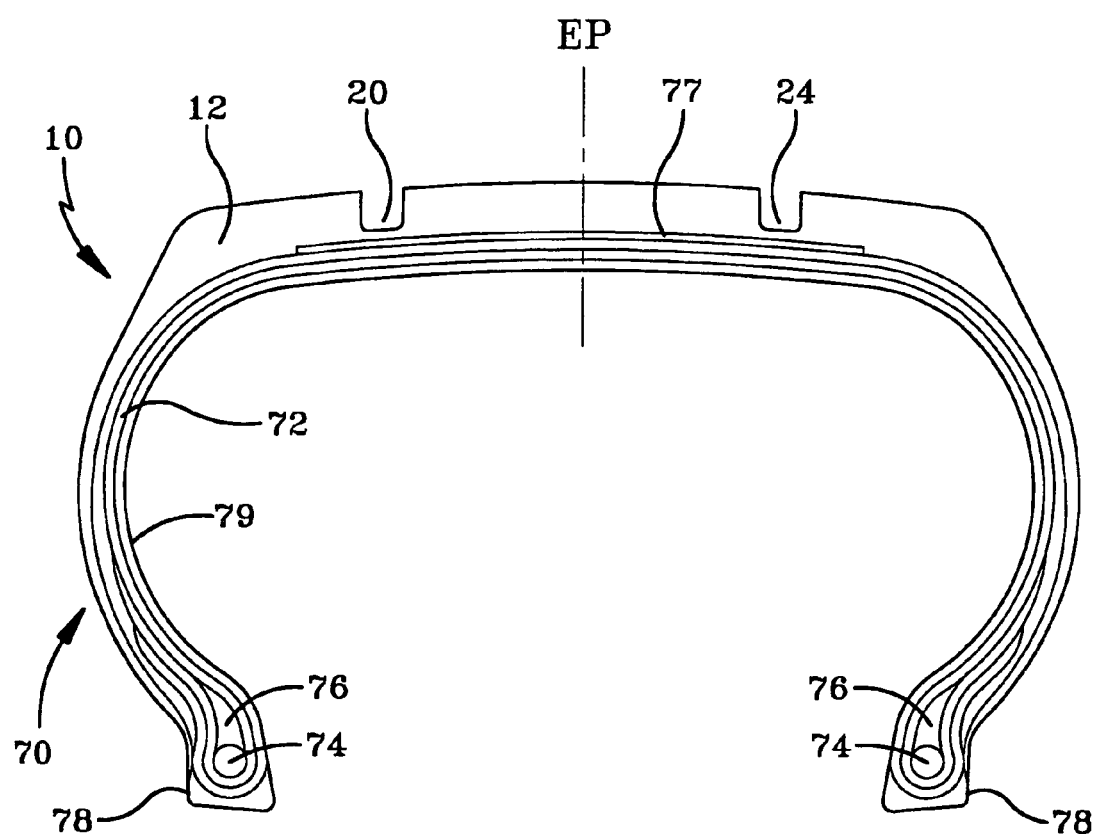
FIG. 4 is a cross-sectional view of the tire of FIG. 2.
Figure 5:
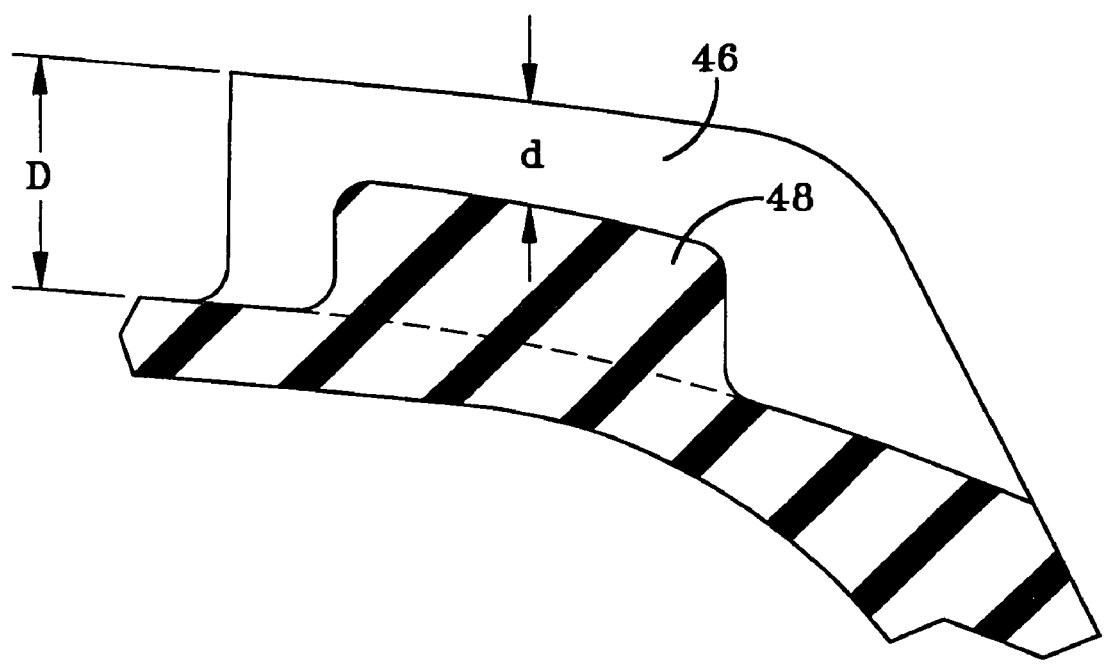
FIG. 5 is a cross-sectional view of the curved groove (46) of FIG. 4.
Figure 9:
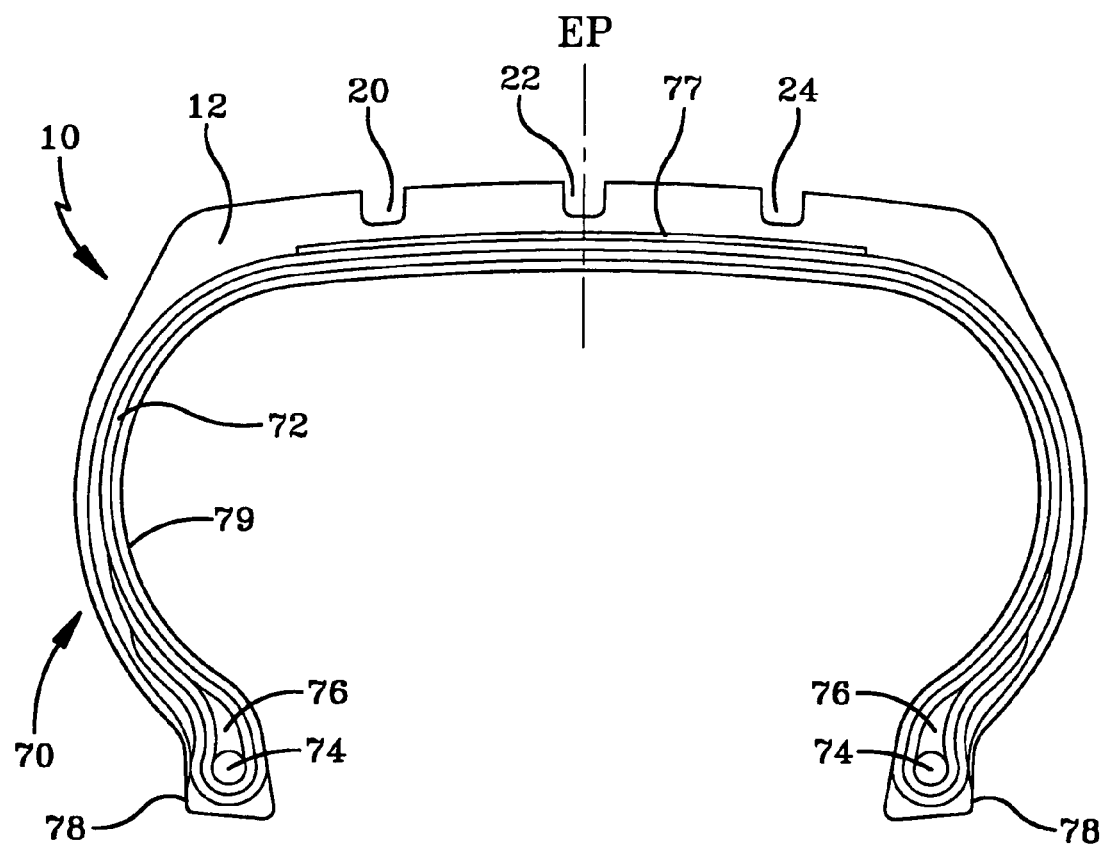
FIG. 9 is a cross-sectional view of the tread of FIG. 7.

As shown in FIGS. 4 and 9, the tread (12) when used with a tire (10) employs a tire (10) preferably having a carcass (70) with one or more plies (72) reinforced by radially extending synthetic or metal cords and a pair of substantially inextensible bead cores (74), an apex (76) radially above the bead cores 74 and a belt reinforcing structure (77) radially outward of the plies (72). The tire (10) as shown has an air impervious halobutyl liner (79) and a rubber chafer (78) common in tubeless type tires.

While the carcass is considered important, the focus of the present invention resides in the tread (12) and its unique construction. In the first embodiment as shown in FIG. 1, the tread (12) has two circumferentially continuous grooves (20,24). Interposed between the two circumferentially continuous grooves is a rib (30) that extends continuously around the circumference of the tread (12). The rib (30) has a plurality of circumferentially spaced hook-shaped semi-blind grooves (40) arranged in a first row (1) and a second row (2). The hook-shaped semi-blind grooves (10) of the first row (1) originate at the circumferentially continuous groove (20) and the hook-shaped semi-blind grooves (40) of the second row (2) originates from the circumferentially continuous groove (24). Each hook-shaped semi-blind grooves (40) extends obliquely into the rib, having a first open portion (41) intersecting the circumferential grooves (20 or 24) and a blind portion (42) extending from the open portion (41). A centerline (45) bisecting the two portions (41,42) as used herein defines the inclination of the hook-shaped semi-blind grooves (40).

As illustrated the centerline (45) of the hook-shaped semi-blind grooves (40) is inclined at an angle θ in the range of 30° to 60° relative to the equatorial plane (EP) of the tread (12). The equatorial plane (EP) of the tread (12) lies midway between a pair of lateral tread edges and perpendicular to the axis of rotation of the tire (10).

The blind portion (42) extends to an end (47) at which point a sipe incision (50) extends. The sipe incision (50) has virtually no width and accordingly is closed in the treads contact patch. The hook-shaped semi-blind grooves (40) preferably have a width in the range of 2 mm to about 9 mm. The width of the hook-shaped semi-blind grooves diminishes continuously from the groove portion adjacent the circumferentially extending grooves (20,22,24) toward the interior of the rib and preferably varies from 5 to 7.5 mm at the intersection of the circumferentially continuous groove and the width at the end portion of the semi-blind grooves varies from 2 to 2.5 mm.

The orientation of the hook-shaped semi-blind grooves (40) accept fluids directing them laterally inwardly and expelling the fluid as the tire rotates in the generally circumferentially extending dissection.

Similarly the noise generated by the tread at the rib (30) at least partially directs itself laterally inwardly and is expelled as the tire rotates circumferentially from the blind portion (42). This assists in reducing the tread noise appreciably.

The use of circumferentially extending grooves (20,22, 24) provide openings for the tire generated noise to be further dampened.

The shoulders of the tread (12) adjacent each lateral tread edge (14,16) has a rib (34,36). The ribs (34,36) each have a plurality of circumferentially spaced curved grooves (46). Each curved groove (46) originates at a circumferentially continuous groove (20,24) and at its origin the curved groove (46) is substantially linearly aligned with a hook-shaped semi-blind grooves (40) such that the originating open portion (41) is inclined similarly to the originating portion of the curved groove (46). The curved groove (46) bends about 90° relative to its origin and then opens laterally over the tread shoulders. In each bend of the curved groove (46) is a tie bar (48). The curved groove (46) has a full groove depth (D) at the lateral extremes and a reduced depth (d) therebetween the lateral extremes, (d) being about 50% of D or less. This shoulder rib grooving provides additional traction grooving for the tread (12). The shoulder rib grooving has excellent noise dampening properties because the groove cross-sectional area goes from large to small to large creating a contraction then an expansion of the acoustical sound waves. This dampening is increased by the curvature of the grooves (46), which at the lateral extreme takes on abrupt 90° turn as the air exhaust over the shoulder. These features greatly reduce the noise generation of the tread.

All of the features described above in reference to the tire (10) and tread (12) of FIGS. 1–5 apply to the second embodiment tire (10) of FIGS. 6 through 9.

Figure 6:
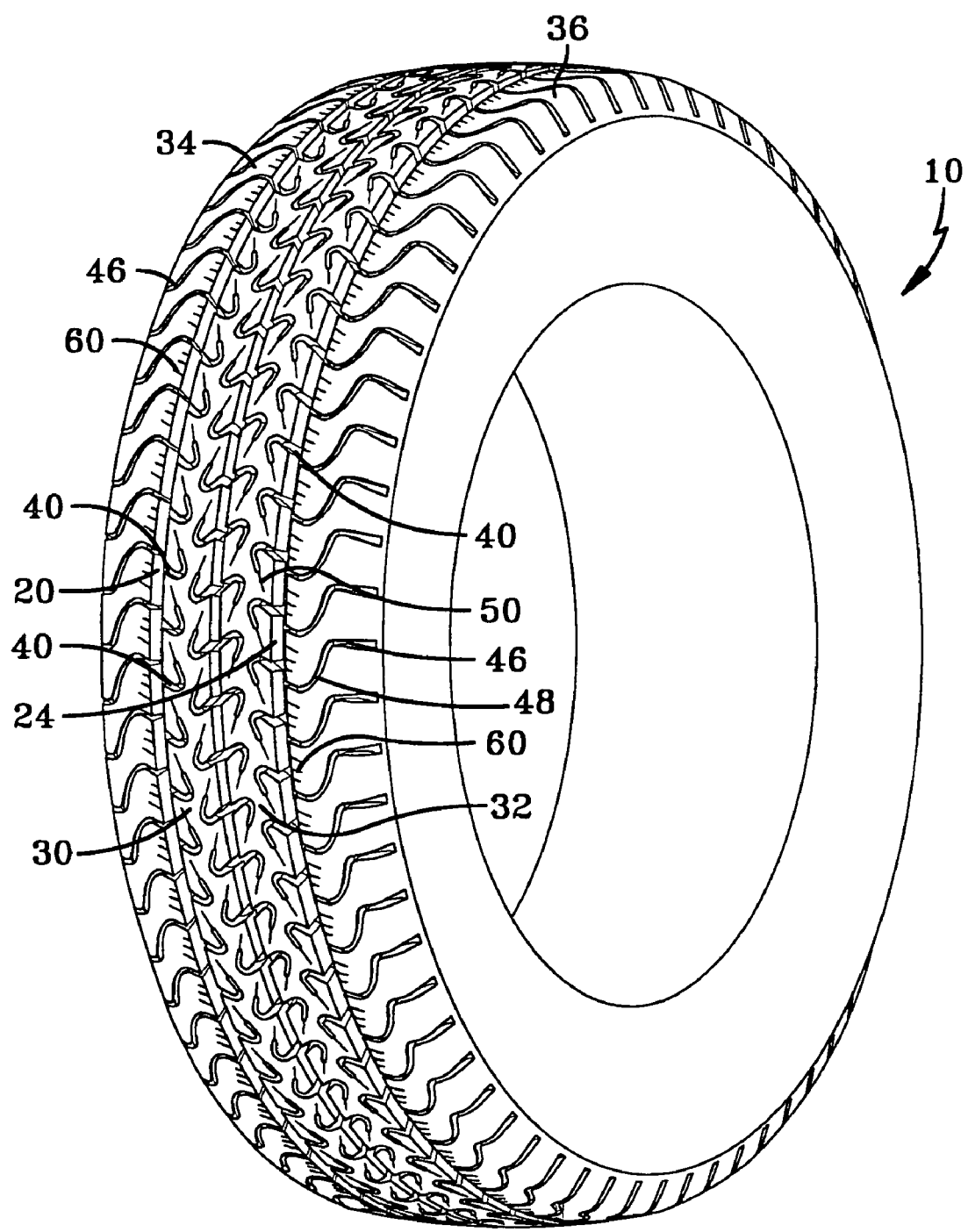
FIG. 6 is a perspective view of the tread according to a second embodiment of the invention.
Figure 7:
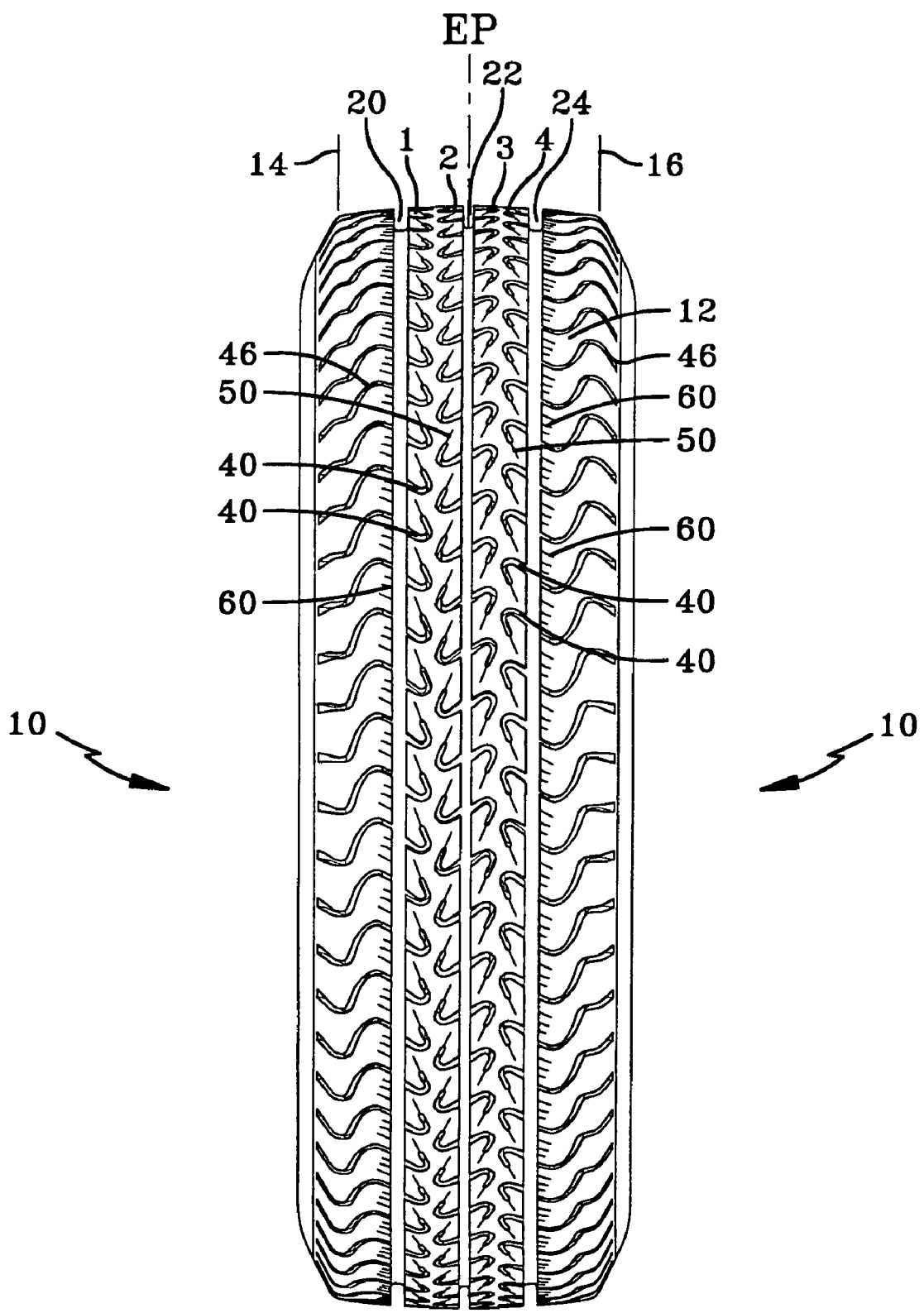
FIG. 7 is a plan view of the tread of FIG. 6.
Figure 8:
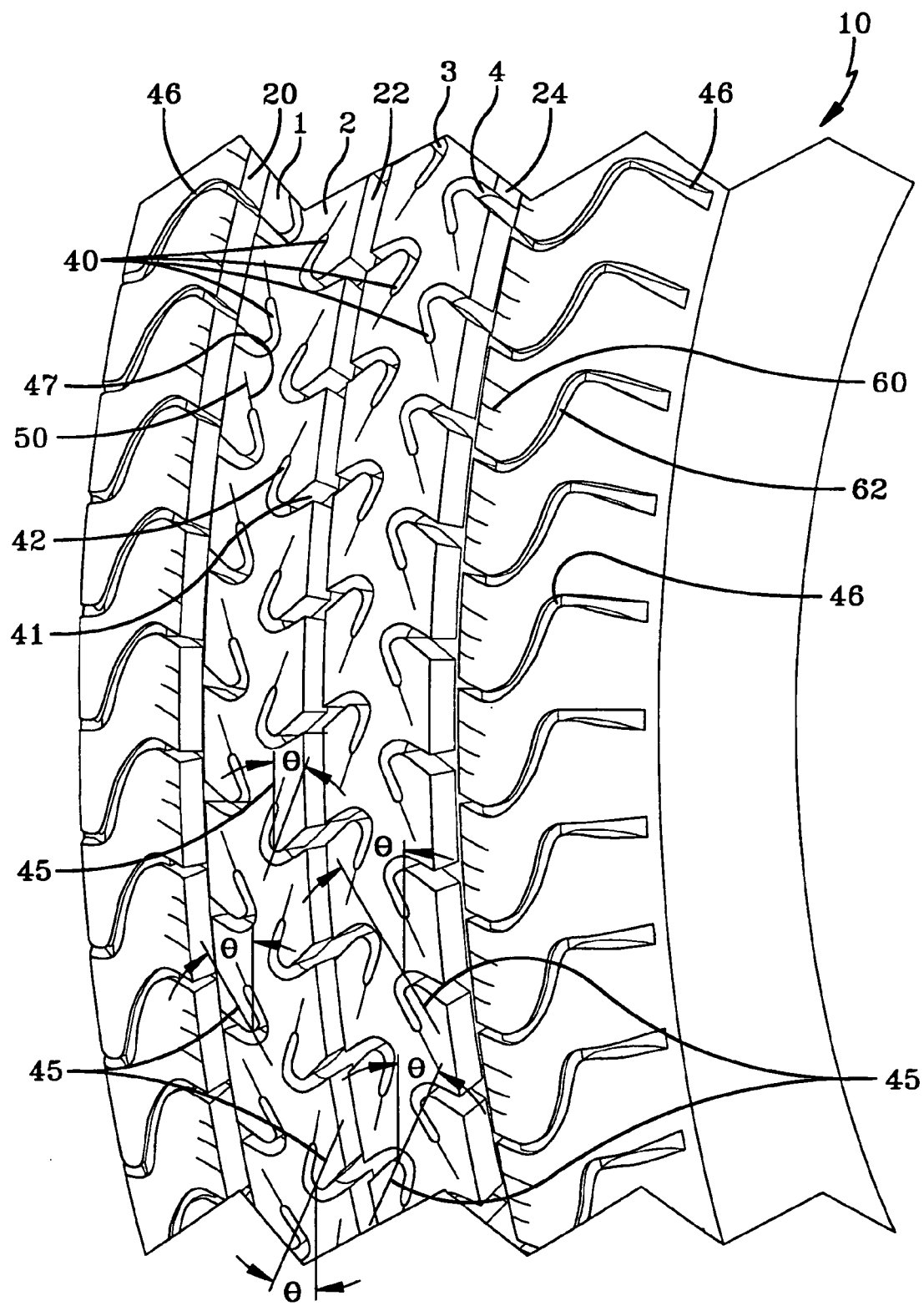
FIG. 8 is an enlarged fragmentary view of the tread of FIG. 7.

As shown in FIG. 6, the second embodiment tire (10) has the tread (12) having three circumferentially continuous grooves (20,22,24) and two ribs (30,32) located between the grooves (20,22,24).

In this embodiment the groove (22) is a common groove to both adjacent ribs (30,32). The hook-shaped semi-blind grooves (40) of each rib (30,32) intersecting the common circumferentially continuous groove (22), intersects the groove (22) at a substantially circumferentially aligned location relative to the intersection of the axially adjacent hook-shaped semi-blind grooves (40) of the other rib (30, or 32).

An important difference from the first embodiment tread (12) having a single central rib (30) is that the hook-shaped semi-blind grooves (40) in the rib (30) are arranged in a first row (1) and a second row (2) wherein the grooves (40) in the first row (1) are similarly oriented but oppositely inclined with respect to the other row (2) of grooves (40). Additionally, the hook-shaped semi-blind grooves (40) of the second rib (32) are also arranged in two rows (3,4), the row (3) being similarly oriented, but oppositely inclined relation to the grooves (40) of row (4) with both rows (3 and 4) of grooves (40) being opposite oriented relative to both rows (1 and 2) of grooves (40). The tread (12) of FIGS. 6 through 9 is most preferred because the four rows (1,2,3,4) of hook-shaped semi-blind grooves (40) creates a large increase in traction capability that enhances the heavy loaded cargo van handling characteristics and increases the snow traction capability of the tire due in part to the numerous use of sipe incisions (50) extending from each hook-shaped semi-blind grooves (40).

In each shoulder rib (34,36) a series of three sipes (60) are located between each curved groove (46) at the edge of the circumferentially continuous groove (20,24). The sipes (60) help in reducing river wear along the edge of the shoulder rib (34,36).

A technically significant feature of both embodiments is that the ribs (30,32) have the hook-shaped semi-blind grooves (40) spaced such that the edges or the ribs adjacent the grooves (20,22,24) have a uniform lateral bending stiffness and circumferential stiffness. Furthermore, the oblique inclination of the grooves means that in the central portion of each rib (30,32) the bending stiffness is also reduced. This enables the tread to easily enter and leave the contact patch or footprint without creating undue stresses on the tread or the underlying belt reinforcing structure (77) of the tire carcass (70).

For the reasons stated above, the tread (12) in both embodiments yields an extremely durable design having improved on-road traction under heavy load and snow conditions while also maintaining low noise levels.

What is claimed is:

1. A tire (10) comprising a tread (12), the tread having three circumferentially continuous grooves (20,22,24), and two continuous ribs (30,32), each rib (30,32) being adjacent to and between a pair of the circumferentially continuous grooves (20,22) or (22,24), the tread characterized by:
   a plurality of circumferentially spaced hook-shaped semi-blind grooves (40), each of the hook-shaped semi-blind grooves (40) having an open portion (41) and a single blind portion (42) extending from the open portion (42) wherein a centerline (45) that bisects the open portion (41) and the blind portion (42) is inclined obliquely relative to an equatorial plane (EP) of the tread, the hook-shaped semi-blind grooves originating in one of the circumferentially extending grooves (20,22,24) and arranged in two rows (1,2,3,4) in each continuous rib (30,32), the second row of hook-shaped semi-blind grooves (40) in each rib being similar in shape, but circumferentially offset from the hook-shaped semi-blind grooves in the first row, the rows of hook-shaped semi-blind grooves being laterally spaced from each other and wherein the hook-shaped semi-blind grooves (40) of one rib (30) are oppositely oriented relative to the hook-shaped semi-blind grooves (40) in the other rib (32).

2. The tire (12) of claim 1 wherein the hook-shaped semi-blind grooves (40) in each rib (30,32) intersect a common circumferentially continuous groove (22) at a substantially circumferentially aligned location relative to the intersection of the axially adjacent hook-shaped semi-blind grooves (40) of the other rib (30 or 32).

3. The tire of claim 1 wherein the hook-shaped semi-blind grooves (40) of the second row in each rib (30, 32) are oppositely inclined but similarly oriented relative to the hook-shaped semi-blind grooves (40) of the first row in each rib (30, 32).

4. The tire of claim 1 further characterized by a sipe incision (50) extending from and oriented in the same direction as the blind portion (42) of the hook-shaped semi-blind grooves (40).

5. The tire of claim 1 wherein the tread (12) has a pair of lateral tread edges (14,16) defining the tread width (TW) and the distance halfway between the lateral tread edges (14,16) defines the equatorial plane (EP) of the tread (12), and a common circumferentially continuous groove (22) is centered at the equatorial plane (EP) of the tread (12).

6. The tire of claim 1 wherein the centerline (45) of the hook-shaped semi-blind grooves (40) is oriented at an angle θ in the range of 30° to 60° relative to the equatorial plane (EP) of the tread (12).

7. The tire of claim 1 further characterized by a pair of shoulder ribs (34,36), a first shoulder rib (34) being adjacent to and lying between a first lateral edge (14) and a circumferentially continuous groove (20) and a second shoulder rib (36) being adjacent to a second lateral edges (16) and between a circumferentially continuous groove (24) and the second lateral edge (16), wherein each first and second shoulder rib (34,36) has a plurality of circumferentially spaced curved grooves (46) intersecting and adjacent the respective circumferentially continuous grooves (20,24) at locations in substantially linear alignment with the location of intersection of the hook-shaped semi-blind grooves (40) and the respective circumferentially continuous grooves (20,24).

8. The tire of claim 7 wherein each curved groove (46) has a full depth (D) at the lateral extremes and a reduced depth (d) therebetween the lateral extremes, the reduced depth (d) being about 50% of the full depth (D) or less.

9. The tire of claim 1 wherein the width of the hook-shaped semi-blind grooves (40) diminishes continuously from the open portion (41) adjacent the circumferentially extending grooves (20,22,24) toward the interior of the rib and the single blind portion (42).

10. A tire comprising a tread (12), the tread (12) having two or more circumferentially continuous grooves (20,22,24) and a continuous rib (30,32) between an adjacent pair of circumferentially continuous grooves (20,22); the tread (12) characterized by:
   a plurality of circumferentially spaced hook-shaped semi-blind grooves (40), each of the hook-shaped semi-blind grooves (40) having an open portion (41) and a single blind portion (42) extending from the open portion (42) wherein a centerline (45) that bisects the open portion (41) and the blind portion (42) is inclined obliquely relative to an equatorial plane (EP) of the tread, the hook-shaped semi-blind grooves originating in one of the circumferentially extending grooves (20,22,24) and arranged in two rows (1,2,3,4) in the continuous rib (30,32), the second row (2) of hook-shaped semi-blind grooves (40) being similar in shape, but circumferentially offset from the hook-shaped semi-blind grooves in the first row (1), the rows (1, 2) of hook-shaped semi-blind grooves being laterally spaced from each other, and
   a pair of shoulder ribs (34,36), a first shoulder rib (34) being adjacent to and lying between a first lateral edge (14) and a circumferentially continuous groove (20) and a second shoulder rib (36) being adjacent to a second lateral edge (16) and between a circumferentially continuous groove (24) and the second lateral edge (16), wherein each first and second shoulder rib (34,36) has a plurality of circumferentially spaced curved grooves (46) intersecting and adjacent the respective circumferentially continuous grooves (20, 24) at locations in substantially linear alignment with the location of intersection of the hook-shaped semi-blind grooves (40) and the respective circumferentially continuous grooves (20,24), each curved groove (46) changing orientation by about 90 degrees as the groove (46) extends axially toward a lateral tread edge (14,16) and wherein each curved groove (46) has a full depth (D) at the lateral extremes and a reduced depth (d) therebetween the lateral extremes, the reduced depth (d) being about 50% of the full depth (D) or less.

* * * * *